US012681757B2

(12) United States Patent
Deutsher et al.

(10) Patent No.: US 12,681,757 B2
(45) Date of Patent: *Jul. 14, 2026

(54) ACCELERATED MEMORY ALLOCATION

(71) Applicant: Next Silicon Ltd, Givatayim (IL)

(72) Inventors: Yuval Asher Deutsher, Givatayim (IL);
Dan Shechter, Tel Aviv (IL)

(73) Assignee: Next Silicon Ltd, Givatayim (IL)

( * ) Notice: Subject to any disclaimer, the term of this
patent is extended or adjusted under 35
U.S.C. 154(b) by 669 days.

This patent is subject to a terminal dis-
claimer.

(21) Appl. No.: 17/885,654

(22) Filed: Aug. 11, 2022

(65) Prior Publication Data

US 2024/0054016 A1     Feb. 15, 2024

(51) Int. Cl.
*G06F 9/50* (2006.01)

(52) U.S. Cl.
CPC .......... *G06F 9/5016* (2013.01); *G06F 9/5022*
(2013.01); *G06F 2209/5011* (2013.01)

(58) Field of Classification Search
CPC ................ G06F 9/5016; G06F 9/5022; G06F
2209/5011; G06F 12/023
See application file for complete search history.

(56) References Cited

U.S. PATENT DOCUMENTS

| | | | | |
|---|---|---|---|---|
| 5,892,979 A * | 4/1999 | Shiraki | ..................... | G06F 5/06 |
| | | | | 710/52 |
| 2006/0190697 A1 | 8/2006 | Grant | | |
| 2009/0125882 A1* | 5/2009 | Frigo | ..................... | G06F 8/314 |
| | | | | 717/149 |

| | | | | |
|---|---|---|---|---|
| 2010/0306494 A1 | 12/2010 | DeVilbiss et al. | | |
| 2013/0019083 A1* | 1/2013 | Cain, III | ............ | G06F 9/30087 |
| | | | | 712/203 |
| 2014/0359248 A1* | 12/2014 | Peters | ................ | G06F 12/0223 |
| | | | | 711/171 |
| 2015/0269065 A1* | 9/2015 | Bourd | ..................... | G06F 9/526 |
| | | | | 711/155 |
| 2019/0379635 A1* | 12/2019 | Sundararajan | ........ | H04L 61/256 |
| 2020/0151093 A1 | 5/2020 | Gould et al. | | |
| 2025/0110782 A1* | 4/2025 | Zuo | ........................ | G06F 3/061 |

FOREIGN PATENT DOCUMENTS

| | | |
|---|---|---|
| EP | 3120245 | 1/2017 |

OTHER PUBLICATIONS

European Search Report and the European Search Opinion Dated
Dec. 21, 2023 From the European Patent Office Re. Application No.
23190118.2. (7 Pages).
Communication Pursuant to Article 94(3) EPC Dated Mar. 14, 2025
From the European Patent Office Re. Application No. 23190118.2
(6 Pages).

* cited by examiner

*Primary Examiner* — Aimee Li
*Assistant Examiner* — Hsing Chun Lin

(57)          ABSTRACT

There is provided a device for allocation of memory con-
figured for: in response to a request for allocation of a region
of a pool of a memory by a process being executed by a
processor, a memory allocator is configured to perform in a
single atomic operation: read a data structure indicating a
state of allocation of the pool, check the data structure for a
condition, update the data structure according to an outcome
of the check, and return an address of the allocated region of
the memory.

21 Claims, 8 Drawing Sheets

```
1   atomic_allocator_t  g_state[INDEX_OF_SIZE(MAX_SIZE) + 1] = {0};
2
3   void *malloc(size_t n)
4   {
5       atomic_allocator_t *entry_ptr;
6       atomic_allocator_t  entry;
7       unsigned int index;
8
9       /* Computations on n to find out which state to allocate from */
10      n = ROUND_UP(n);
11      index = INDEX_OF_SIZE(n);
12      entry_ptr = &g_state[index];
13
14      /* Use hardware instruction to allocate memory and update state */
15      entry = _atomic_allocate(entry_ptr, n, __ATOMIC_RELAXED);
16      if (!VALIDITY(entry) || OVERFLOW(entry))
17          /* Unlikely, go to slow path where new memory is mapped */
18          return malloc_slow(n);
19
20      return POINTER(entry);
21  }
```

Figure 8:
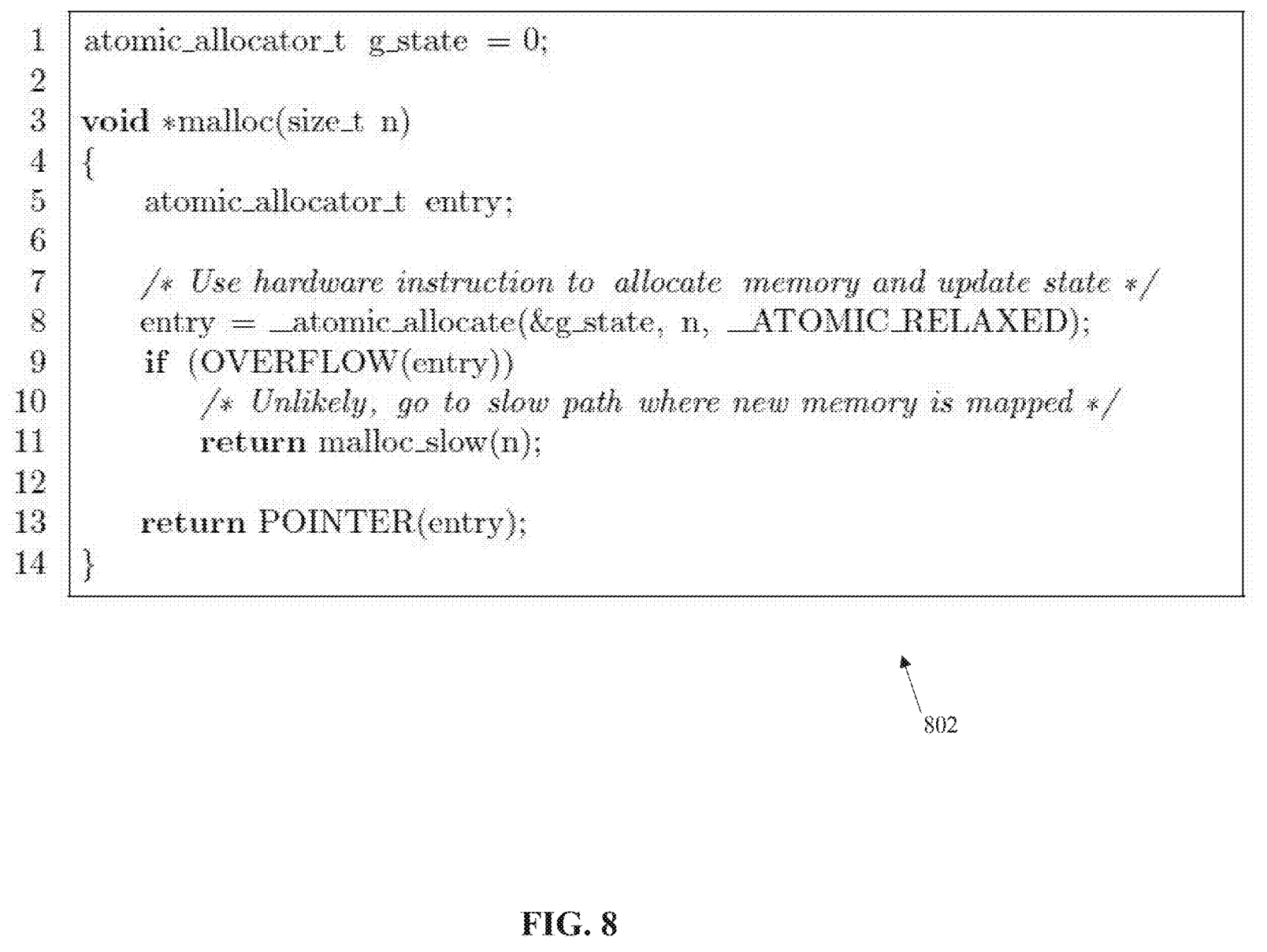

```
1   atomic_allocator_t  g_state = 0;
2
3   void *malloc(size_t n)
4   {
5       atomic_allocator_t  entry;
6
7       /* Use hardware instruction to allocate  memory and update state */
8       entry = _atomic_allocate(&g_state, n,  _ATOMIC_RELAXED);
9       if (OVERFLOW(entry))
10          /* Unlikely, go to slow path where new memory is mapped */
11          return malloc_slow(n);
12
13      return POINTER(entry);
14  }
```

ACCELERATED MEMORY ALLOCATION

RELATED APPLICATION

This application is related to, and being co-filed with, U.S. patent application, entitled "MEMORY MANAGEMENT IN A MULTI-PROCESSOR ENVIRONMENT", by at least one common Inventor as Inventors of the instant application, and incorporated herein by reference in its entirety.

BACKGROUND

The present invention, in some embodiments thereof, relates to memory allocation and, more specifically, but not exclusively, to operations for allocation of memory.

A memory allocator allocates memory for use by executing processes. Standard general processor architectures include built-in atomic memory operations, for example, atomic read-modify-write memory operations, which are designed to allocate memory while addressing the problem of concurrency.

SUMMARY

According to a first aspect, a device for allocation of memory is configured for: in response to a request for allocation of a region of a pool of a memory by a process being executed by a processor, a memory allocator is configured to perform in a single atomic operation: read a data structure indicating a state of allocation of the pool, check the data structure for a condition, update the data structure according to an outcome of the check, and return an address of the allocated region of the memory.

According to a second aspect, A method of allocation of memory comprises: performing in a single atomic operation in response to a request for allocation of a region of a pool of a memory: reading a data structure indicating a state of allocation of the pool, checking the data structure for a condition, updating the data structure according to an outcome of the checking, and returning an address of the allocated region of the memory.

According to a third aspect, a non-transitory medium storing program instructions for allocation of memory, which, when executed by at least one processor, cause the at least one processor to: read a data structure indicating a state of allocation of the pool, check the data structure for a condition, update the data structure according to an outcome of the checking, and return an address of the allocated region of the memory.

In a further implementation form of the first, second, and third aspects, the processor is designed according to a data-flow processing architecture.

In a further implementation form of the first, second, and third aspects, the processor is designed for a customized architecture designed to perform at least one of: signal processing, network routing, graphics, and telemetry.

In a further implementation form of the first, second, and third aspects, the memory allocator is further configured to release previously allocated memory in the single atomic operation, in response to a request to release the memory.

In a further implementation form of the first, second, and third aspects, the memory allocator is further configured to increase a counter designated for the pool in response to the request to release the memory, wherein a location of the counter is computed according to an address of the memory being freed, and the pool is returned to a memory manager in response to the counter value indicating that all memory in the pool is freed.

In a further implementation form of the first, second, and third aspects, the data structure comprises a bitmap, wherein the memory allocator is further configured to set a bit in the bitmap designated for the pool in response to the request to release the memory, the set bit indicating that the allocated region of the memory was released, wherein the pool is returned to the memory manager in response to a value of the bitmap indicating that all memory in the pool is freed, wherein memory allocator uses the bitmap for reusing released memory regions in future allocations.

In a further implementation form of the first, second, and third aspects, the data structure comprises a linked-list, wherein the memory allocator is further configured to write an entry in the linked-list in response to the request to release the memory, wherein the memory allocator uses the linked-list for reusing released memory chunks in future allocations.

In a further implementation form of the first, second, and third aspects, during the read the data structure indicating the state of allocation of the pool, the single atomic operation further comprises reading the data structure implemented as one of a bitmap and a linked-list, and uses a previously released memory chunk for the allocation.

In a further implementation form of the first, second, and third aspects, the single atomic operation is a non-interruptible operation, wherein a sequence of the read, the check, the update, and the return operations cannot be interrupted once initiated.

In a further implementation form of the first, second, and third aspects, the single atomic operation operates sequentially in response to a request, wherein concurrent requests are sequentially processed.

In a further implementation form of the first, second, and third aspects, the single atomic operation excludes at least one of: a request to a memory manager to obtain the pool of the memory, and a request to the memory manager to return the pool to the memory, wherein the pool is allocated by the memory allocator.

In a further implementation form of the first, second, and third aspects, the memory is divided into a single area for each one of a plurality of size classes, each single area is further divided into a plurality of slots, each slot comprises the pool for allocation by the memory allocator for allocation sizes that match a size class corresponding to the pool, wherein reading the data structure comprises checking a number of allocations previously performed for the slot indicating an amount of space remaining in the slot for allocation.

In a further implementation form of the first, second, and third aspects, the data structure includes a plurality of fields, wherein: an offset field indicates an address of a next chunk of memory to be returned in response to a next request, a counter field indicating the number of allocations previously performed for the slot, a validity field used for a first allocation of the single area indicating that the memory allocator has not yet been initialized, and an overflow field indicates whether the offset field points to a valid allocation.

In a further implementation form of the first, second, and third aspects, check the data structure for a condition comprises: in response to the validity field bit being unset or the overflow field being set, the overflow field is set, otherwise the offset field is increased by a size of the allocated memory, and a counter field is increased by 1.

In a further implementation form of the first, second, and third aspects, check the data structure for a condition comprises: in response to the counter field increasing by 1, the counter field overflows into the data structure, and the offset field value prior to the increase by the size of the allocated memory is returned.

In a further implementation form of the first, second, and third aspects, the processor further executes a code for: in response to the validity field being unset, or the overflow field having a first value, requesting a new pool from a memory manager, in response to the overflow field having a second value indicating another request for a new pool is being made from the memory manager, waiting a time interval for the another request to complete, and requesting the new pool from the memory manager, and in other cases use the offset field to determine the allocated memory.

In a further implementation form of the first, second, and third aspects, the pool is divided into regions of arbitrary sizes.

In a further implementation form of the first, second, and third aspects, the data structure includes a plurality of fields, wherein: an offset field indicates an address of a next chunk of memory to be returned in response to a next request, a size field indicating a size of the pool, and an overflow field indicates whether the offset field points to a valid allocation.

In a further implementation form of the first, second, and third aspects, update the data structure comprises: in response to a total allocated size of a slot comprising the pool being increased beyond a total size of the slot, setting the overflow field to a first value, when the overflow field is set to the first value, setting the overflow field to a second value, wherein the processor executes a code for requesting another pool in response to the first value, and waiting for a previous task to complete in response to the second value.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 7 is an exemplary pseudocode for using the single atomic operation for allocation of memory, in accordance with some embodiments of the present invention; and FIG. 8 is another exemplary pseudocode for using the single atomic operation for allocation of memory, in accordance with some embodiments of the present invention.

DETAILED DESCRIPTION

Figure 1:
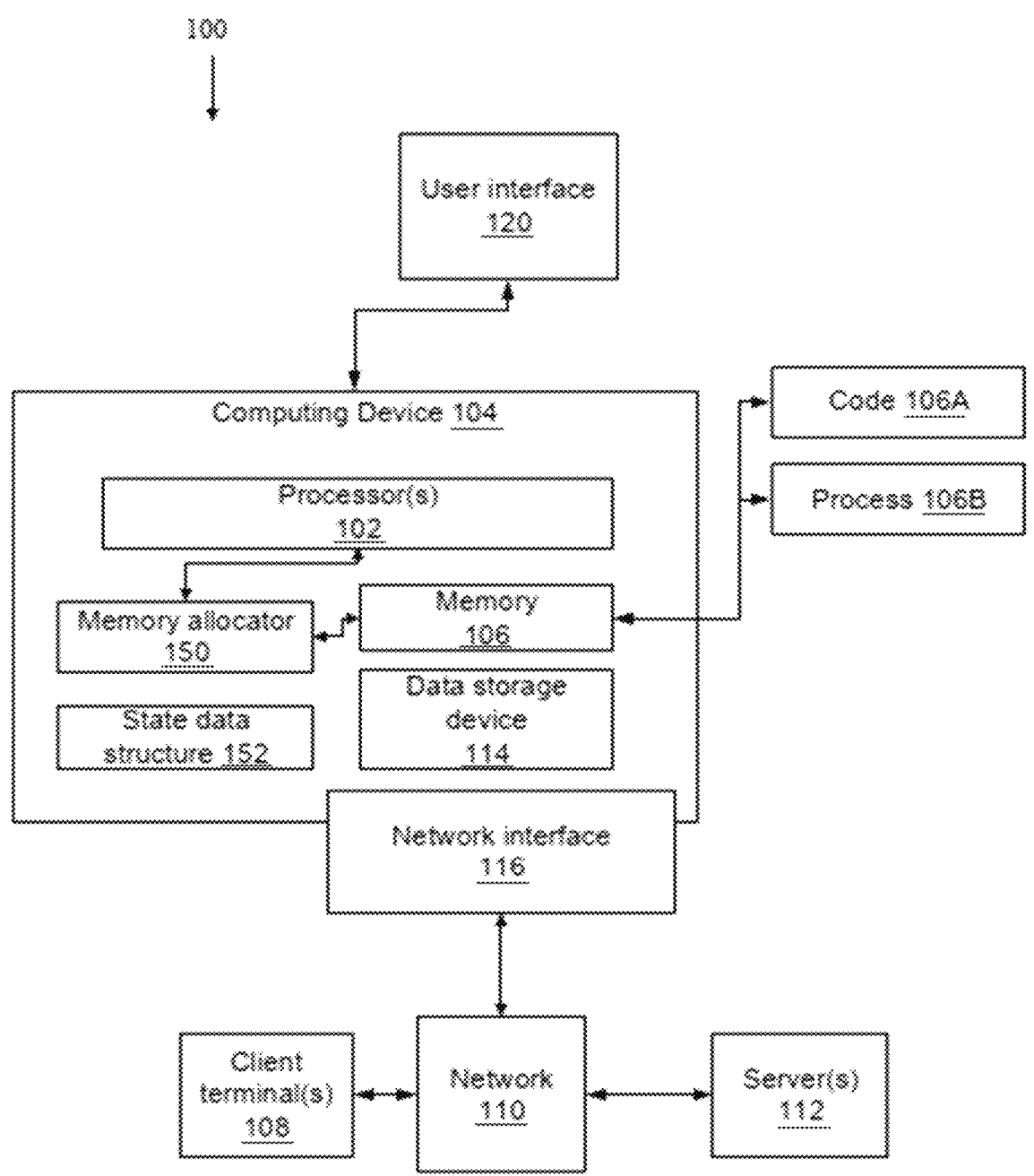
FIG. 1 is a block diagram of components of a system for allocation of a memory in a single atomic operation by a memory allocator, in accordance with some embodiments of the present invention.

The present invention, in some embodiments thereof, relates to memory allocation and, more specifically, but not exclusively, to operations for allocation of memory.

An aspect of some embodiments of the present invention relates to devices, circuitry, and/or processors, that include and/or are in communication with a memory allocator, and methods (e.g., that implement the memory allocator) for allocation of memory in a single atomic operation. The memory allocator that performs the single atomic operation may be implemented, for example, in hardware, software, firmware, and/or combinations thereof. The memory allocator is designed to perform allocation of memory in a single atomic operation, in response to a request for allocation of a region (e.g., of a pool) of a memory, for example, by a process being executed by a processor that is in communication with the memory allocator and/or that includes the memory allocator. The following sub-operations are implemented during the single atomic operation: reading a data structure indicating a state of allocation of the memory (e.g., the pool), checking the data structure for a condition, updating the data structure, and returning an address of the allocated region of the memory.

The single atomic operation prevents concurrently executing processes from simultaneously attempting to allocate the same memory region, and/or other concurrency problems impacting the memory allocation processes. The single atomic operation is performed in less time (i.e., improved performance) in comparison to other memory allocation approaches that address the problem of concurrency. Other approaches address the issue of concurrency at a higher performance cost. For example, some existing allocators use synchronization objects which ensure that the allocation process is never executed simultaneously from different execution instances, thus solving the problem of concurrency. However, the use of synchronization between different execution instances comes at a performance price. Moreover, the use of multiple memory operations further impairs performance.

At least some implementations described herein address the technical problem of reducing the time it takes to perform a memory allocation operation. At least some implementations described herein improve the technical field of processor design and/or the technical field of memory allocators, by providing a memory allocator (e.g., hardware, software, firmware, or combinations of the aforementioned) that reduces the time it takes to perform a memory allocation operation.

Inventors discovered that in processors designed for high performance computing, and/or in processors designed based on a data-flow architecture, and/or in processors designed (or configured) for specialized and/or customized, application (e.g., signal processing, network routing, graphics, and telemetry), time to perform a memory allocation operation is a significant bottleneck for improving performance of the processor, in comparison to efficiently allocation of memory (e.g., reducing unused memory region, reducing overhead). Data-flow may refer to a computer programming paradigm that models at least part of a software program as a directed graph of data flowing between operations such that a series of operations is applied to each data element in a sequence of data elements.

Inventors discovered that there is a tradeoff between reduction in time to perform the memory allocation operation, and memory allocation operations that efficiently allocate memory. Embodiments described herein are designed to reduce time to perform the memory allocation operation, by providing a memory allocator (e.g., hardware, software, firmware, or combinations of the aforementioned) that performs the memory allocation in a single operation, even at the cost of less efficient allocation of the memory. This is in contrast to standard memory allocation approaches, such as in general purpose processors that have built-in atomic operations, where multiple atomic operations are used to perform the memory allocation operation. In the general purpose processors, the multiple atomic operations are designed to allocate memory more efficiently, at the cost of a longer amount of time to perform the memory allocation. Since prior approaches (e.g., using multiple atomic operations) are directed to the technical problem of improving efficiency of the memory allocation process, prior approaches do not relate to a memory allocator that performs the memory allocation operation in a single operation, since a memory allocator that performs the memory allocation operation in a single operation would reduce efficiency of the memory allocation operation in comparison to the standard approaches.

Additional details to help understand memory allocation are now provided. Memory allocation in general deals with the problem of dividing large chunks of memory to smaller chunks, and handing them to applications according to application-dictated lifetime rules that are usually not known to the memory allocator a priori.

An application may request (e.g., using "malloc") chunks of memory of arbitrary sizes, and release (e.g., using "free") previously allocated chunks at arbitrary times. A memory allocator observes those events in chronological order, and processes them in real-time. Malloc requests are satisfied by replying with a memory chunk of at least the requested size which is not overlapping with any other already allocated memory chunk, while free requests require no reply, and serve to notify the memory allocator that the specific chunk can now be re-used or otherwise manipulated.

In order to satisfy those requests, a memory allocator utilizes large blocks ("pools") of memory which are similarly requested from and returned to an operating system or another supervisor or platform, along with other memory used for internal data structures of the allocator (the allocator's "state").

At least some embodiments described herein relate to a memory allocator (e.g., hardware (i.e., circuitry), software, firmware, or combinations of the aforementioned) design that performs memory allocation and updating of a field indicating status of the allocated memory in a single operation. The single operation improves performance by reducing requests for new pools, which entails a considerable delay, and/or by reducing computations and memory accesses done by the allocator's algorithm itself.

The improvement obtained by the memory allocator described herein, which is designed to perform the single operation, is over existing allocator designs. Some classic allocator designs use data structures such as linked lists to manage available chunks of memory, and/or employ techniques involving splitting and merging of chunks of memory. Existing allocator implementations sometimes employ atomic read-modify-write memory operations, which are supported in many modern general processor architectures. These operations allow safe concurrency while also reducing the number of memory access operations performed. However, most general processor architectures only support a handful of very simple and common read-modify-write operations, such as: fetch-and-add, compare-and-exchange, test-and-set. Therefore, these operations need to be used as building blocks of a larger allocator algorithm, and cannot perform the entirety of the allocator logic alone. As discussed above, using the atomic operations may provide efficient memory management and utilization (e.g., reducing memory fragmentation which cannot be allocated), at the tradeoff cost of increased time to perform the memory allocation. In contrast, the memory allocator described herein, which is designed to perform the single operation, reduces the time to perform the memory allocation, even at a tradeoff cost of reduced efficiency of the allocated memory.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
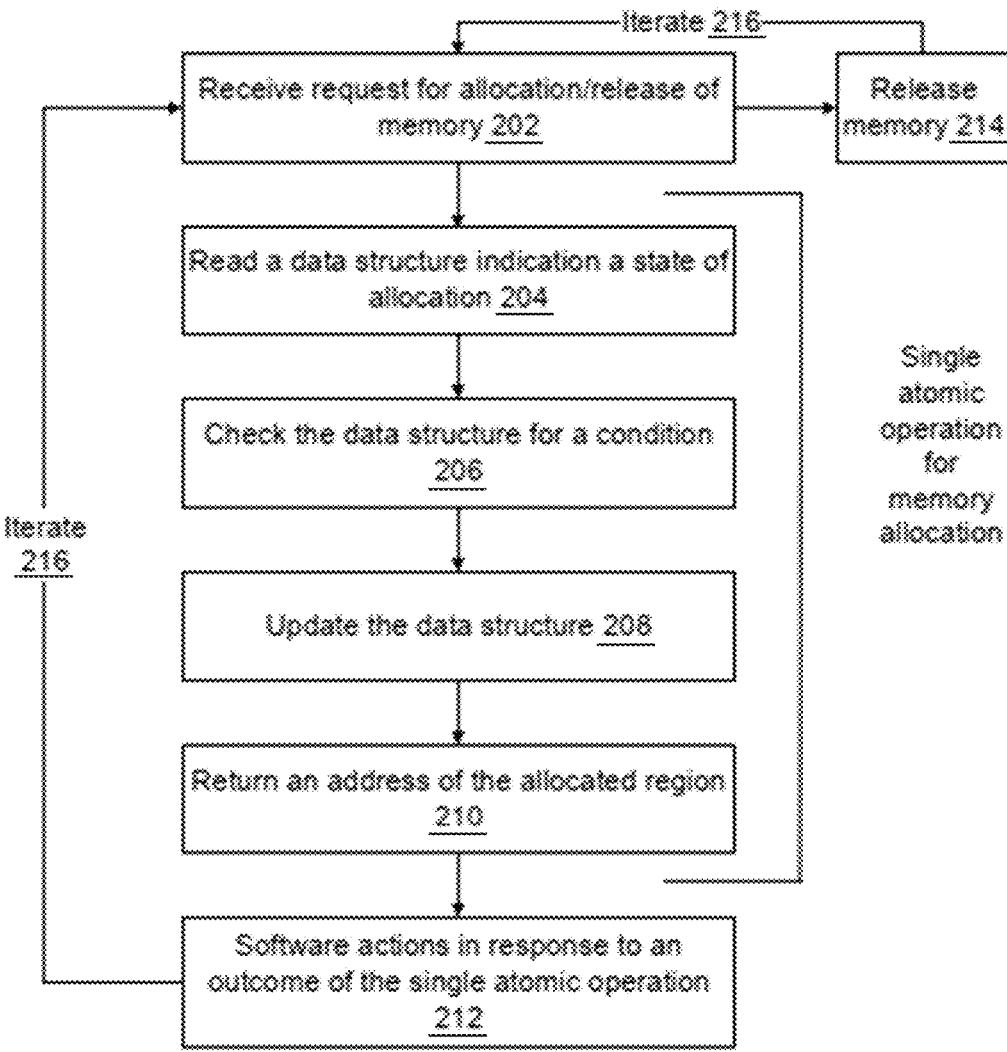
FIG. 2 is a flowchart of a method for allocation of a memory in a single atomic operation by a memory allocator, in accordance with some embodiments of the present invention.

Reference is now made to FIG. 1, which is a block diagram of components of a system 100 for allocation of a memory 106 in a single atomic operation by a memory allocator 150, in accordance with some embodiments of the present invention. Reference is also made to FIG. 2, which is a flowchart of a method for allocation of a memory in a single atomic operation by a memory allocator, in accordance with some embodiments of the present invention.

Memory allocator 150 may be implemented as hard-wired circuitry, optionally as an integrated circuit. Memory allocator 150 may be integrated within processor(s) 102, and/or in communication with processor 102. Alternatively or additionally, memory allocator 150 may be implemented as code instructions (i.e., software) stored on memory 106, for execution by processor(s) 102 and/or by another processor(s). Alternatively or additionally, memory allocator 150 may be implemented as firmware.

Memory allocator 150 may receive requests for allocation of memory from processor(s) 102 (e.g., within which memory allocator 150 is integrated, and/or which runs the code implementation of memory allocator 150), from another local processor(s) which may be a processor external to memory allocator 150 (e.g., on a same card, on a different card within the computing device) and/or from a remote processor which is located externally to the computing device, for example, a processor of client terminal 108 and/or server(s) 112, for example, where the processor of client terminal 108 and/or server(s) 112 uses a remote direct memory access (RDMA) based protocol to request allocation of memory 106 of computing device 104 over network

116 from memory allocator 150. Memory allocator 150 may receive the request for allocation of memory from another processor, for example, according to a method of cross allocation and/or de-allocation (free) memory across multiple heterogeneous process circuitry (e.g. CPU, GPU, FPGA, NextSilicon, and the like)—as the heterogeneous process circuitry have a shared memory to communicate on (e.g., SHMEM/CXL/PCI-e, other type of BUS), reduction to software processes that run on the two (or more) process circuitry (atomics, etc.), and/or reduction to hardware assist.

Processor(s) 102A may be implemented based on a data-flow architecture, i.e., an architecture designed for data-flow. Alternatively or additionally, processor(s) 102A may be implemented based on non-data flow architectures (i.e., an architecture that is not designed for data-flow, for example, central processing unit (CPU), graphics processing unit (GPU), data processing unit (DPU), field programmable gate array (FPGA), coarse-grained reconfigurable arrays (CGRA), Quantum computer, and the like. Processor(s) 102A may be implemented as a customized and/or specialized processor, for example, to perform signal processing, network routing, graphics, and telemetry. Processor(s) 102A may be implemented as, for example, a CPU, a GPU, FPGA, digital signal processor(s) (DSP), and application specific integrated circuit(s) (ASIC). Processor(s) 102A may include a single processor, or multiple processors (homogeneous or heterogeneous) arranged for parallel processing, as groups/clusters and/or as one or more multi core processing devices.

Memory allocator 150 accesses and/or updates a state data structure 152 indicating a state of allocation of a pool of a memory 106, and allocates regions of the pool of memory 106, as described herein.

Memory may be implemented as non-volatile memory, for example, a random access memory (RAM), dynamic random access memory (DRAM) and/or storage class memory (SCM). Memory 106 may store a process 106B that requests the memory allocation from memory allocator 150 (e.g., via processor 102) and/or memory 106 may store other code 106A.

Processor(s) 102, memory allocator 150, state data structure 152, and memory 106 may be located within a computing device 104. Computing device 104 may be implemented as, for example one or more and/or combination of: a group of connected devices, a higher performance computer (HPC), a network node (e.g., router, bridge), a client terminal, a server, a virtual server, a computing cloud, a virtual machine, a desktop computer, a thin client, and/or a mobile device (e.g., a Smartphone, a Tablet computer, a laptop computer, a wearable computer, glasses computer, and a watch computer).

Computing device 104 may include a data storage device 114 for storing data, for example, programs, applications and/or processes that when loaded into memory 106 and are executed by processor(s) 102 request allocation of memory 106 from memory allocator 150. Data storage device 114 may be implemented as, for example, a memory, a local hard-drive, virtual storage, a removable storage unit, an optical disk, a storage device, and/or as a remote server and/or computing cloud (e.g., accessed using a network connection).

Computing device 104 may receive requests for allocation of memory 106 from one or more remote devices over network 110 via a network interface 116, for example, from a server(s) 112 and/or client terminal(s) 108. For example, computing device 104 is part of a distributed computing architecture participating in a complex computation task with client terminal(s) 108 and/or server(s) 112. In another example, client terminal(s) 108 and/or server(s) 112 accessing computing device 104 trigger requests for allocation of memory by memory allocator 150.

Network 110 may be implemented as, for example, the internet, a local area network, a virtual network, a wireless network, a cellular network, a local bus, a point to point link (e.g., wired), and/or combinations of the aforementioned.

Network interface 116 may be implemented as, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 includes and/or is in communication with one or more physical user interfaces 120 that include a mechanism for a user to enter data and/or view data. Exemplary user interfaces 120 include, for example, one or more of, a touchscreen, a display, a virtual reality display (e.g., headset), gesture activation devices, a keyboard, a mouse, and voice activated software using speakers and microphone.

Referring now back to FIG. 2, at 202, a request for allocation of a region of a memory is received by the memory allocator, as described herein, in which case the process continues with 204. Alternatively, the request is for release of previously allocated memory, in which case the feature described with reference to 214 is implemented.

The request is received from a process being executed by a processor in communication with the memory allocator. For example, the memory allocator is implemented as circuitry integrated within the circuitry of the processor, the memory allocator is installed within the processor, the memory allocator is implemented as circuitry in communication (e.g., using a bus) with circuitry of the processor, the memory allocator is implemented as code instructions stored on a memory and executable by processor(s), the memory allocator is implemented as firmware, and/or the memory allocator is implemented as combinations of the aforementioned. The request for allocation of memory may be received from, for example, one of more of: the processor(s) within which memory allocator is integrated and/or which is running the memory allocator code, from another local processor(s) which may be a processor external to memory allocator (e.g., on a same card, on a different card within the computing device), and/or from a remote processor which is located externally to the computing device, for example, a processor of a client terminal and/or server(s) that uses a remote direct memory access (RDMA) based protocol running over a network to request allocation of memory hosted by the computing device within which memory allocator is installed. Memory allocator may receive the request for allocation of memory from another processor, for example, according to a method of cross allocation and/or de-allocation (free) memory across multiple heterogeneous process circuitry (e.g. CPU, GPU, FPGA, NextSilicon, and the like)—as the heterogeneous process circuitry have a shared memory to communicate on (e.g., SHMEM/CXL/PCI-e, other type of BUS), reduction to software processes that run on the two (or more) process circuitry (atomics, etc.), and/or reduction to hardware assist.

The processor may be designed according to a data-flow processing architecture. Inventors discovered that performance of processors based on data-flow processing architectures may be improved by reducing time taken to perform memory allocation. The performance improvement from the single atomic operation that reduces time to perform the memory allocation may be greater than using standard multiple atomic operations that improve utilization of available memory but at a cost of longer time to perform the memory allocation. The processor may be designed for a customized architecture designed to perform a member selected from a group consisting of: signal processing, network routing, graphics, and telemetry. Performance of such customized architectures may be improved using the single atomic operation that reduces time to perform the memory allocation, in comparison to using standard multiple atomic operations that improve utilization of available memory but at a cost of longer time to perform memory allocation.

The region for allocation may be from a pool of a memory. The memory may be divided into one or more areas, where each area may be divided into multiple slots, where each slot corresponds to a pool, as described herein in additional detail.

In response to receiving the request for allocation of the region of the memory, optionally from the pool of the memory, the memory allocator performs the features described with reference to 204, 206, 208, and 210, in a single atomic operation. The single atomic operation is a non-interruptible operation, i.e., the features described with reference to 204, 206, 208, and 210 cannot be interrupted once the single atomic operation has been initiated. I.e., the sequence of the read, the check, the update, and the return operations cannot be interrupted once initiated.

Optionally, the single atomic operation excludes a request to a memory manager to obtain the pool of the memory. The single atomic operation is for allocation of the pool by the memory allocator, as described herein. The request to the memory manager may be performed, for example, by other code being executed by the processor, which executes the single atomic operation. The code executed by the processor may request an additional pool when an existing pool cannot be used to allocate additional memory, for example, all slots of the current pool have been allocated.

The memory manager described herein may be implemented, for example, on a hosting platform where there are separate hosts and hosted devices, and/or on the same computing device that implements the memory manager and one or more of the memory allocator, the processor, and the memory, with no hosting taking place.

Optionally, the single atomic operation excludes a request to the memory manager to return the pool to the memory. The request may be performed by the other code executed by the processor. The request to return the pool may be performed, for example, when all slots of the pool that have been allocated have been freed.

At 204, the single atomic operation reads a data structure indicating a state of allocation of the pool.

A first exemplary memory architecture, which may be allocated using the single atomic operation described herein, is now detailed. A first exemplary data structure as detailed herein may be based on the first exemplary memory architecture.

The first exemplary memory may be divided into two levels. In a first division level, the memory is divided into a single area for each one of multiple size classes. In a second division level, each single area is further divided into multiple slots. Each slot may be used as the memory pool which is allocated by the memory allocator using the single atomic operation. The slot to be used is selected from the different areas of the different size classes according to the size class into which the requested memory size fits. For example, the closest size class that is higher than the requested memory size is selected, to ensure that the requested memory size can be accommodated. An exemplary is now provided:

In a simple case, three size classes are defined: 1 byte, 2 bytes and 4 bytes. The memory is divided as such: Size 1: 0000 to 1000, Size 2: 1000 to 2000, and Size 4: 2000 to 3000. These are 3 size class areas (i.e., three single areas), 1000 bytes each. Now, each single area is divided to 10 slots, of 100 bytes each. For example, size 1 slot 0 is 0 . . . 100 and size 2 slot 5 is 1500 . . . 1600. In this example, 100 allocations of size 1 may be placed in each size 1 slot, and 25 of size 4 may be placed in each size 4 slot. The single atomic operation can check if there is still room in each slot just by counting how many allocations were already performed in that slot. I.e., 100 allocations may be performed on a slot of size 1. The 101th allocation attempt fails, in which case a code executing the single atomic operation may request additional memory, for example, from the host system (e.g., operating system, platform, hypervisor).

The single atomic operation reads the data structure for checking a number of allocations previously performed for a current slot indicating an amount of space remaining in the current slot for allocation, for example, when the exemplary memory architecture is implemented.

Figure 3:
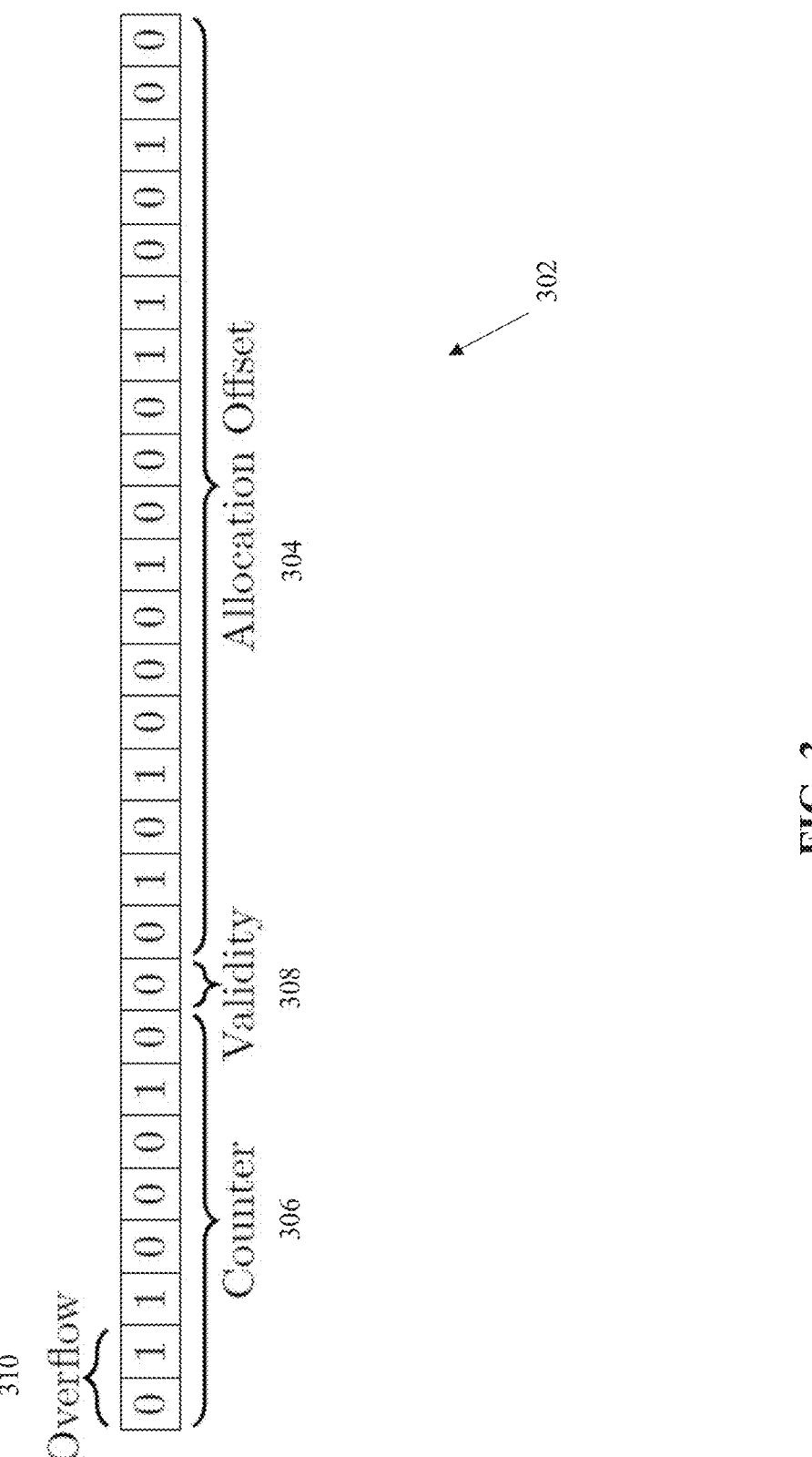
FIG. 3 is a schematic of a first exemplary data structure, designed for the first exemplary memory architecture based on division into class sizes, in accordance with some embodiments of the present invention.

Reference is now made to FIG. 3, which is a schematic of a first exemplary data structure 302, designed for the first exemplary memory architecture based on division into class sizes, in accordance with some embodiments of the present invention.

Data structure 302 includes one or more of the following fields:

An offset field 304—indicating an address of a next chunk of memory to be returned in response to a next request for allocation of memory.

A counter field 306—indicating the number of allocations previously performed for the slot.

A validity field 308—used for a first allocation of the single area indicating that the memory allocator has not yet been initialized. For example, when the memory is initially filled with zeroes, the first allocation will fail because of validity 0 causing an initialization (i.e., requesting the first memory pool from the system). To help understand the significance of the validity field, consider the case if there is no "validity" bit. In such a case, the first allocation would succeed (because allocation offset is 0, counter is 0, overflow is 0, i.e., everything looks fine to proceed) where it should not.

An overflow field 310—indicating whether the offset field points to a valid allocation.

Referring now back to FIG. 2, a second exemplary memory architecture, which may be allocated using the single atomic operation described herein, is now detailed. A second exemplary data structure as detailed herein may be based on the second exemplary memory architecture. In the second exemplary memory structure, the pool is divided into regions of arbitrary sizes, i.e., rather than into slots of the same size according to the memory class as in the first exemplary memory architecture.

Figure 4:
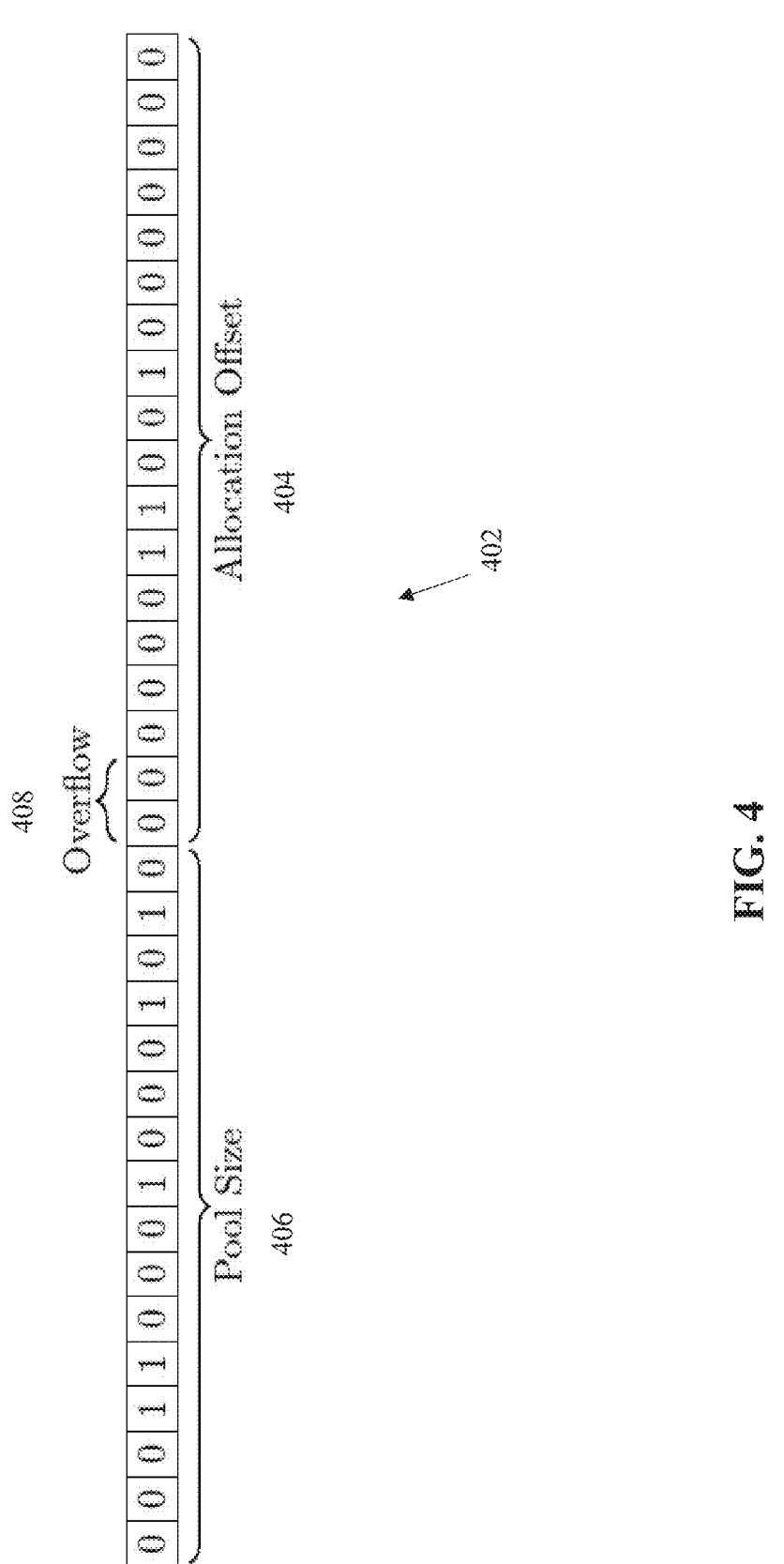
FIG. 4 is a schematic of a second exemplary data structure, designed for the second exemplary memory architecture based on division into arbitrary sizes, in accordance with some embodiments of the present invention.

Reference is now made to FIG. 4, which is a schematic of a second exemplary data structure 402, designed for the second exemplary memory architecture based on division into arbitrary sizes, in accordance with some embodiments of the present invention.

Data structure 402 includes one or more of the following fields:

An offset field 404—indicating an address of a next chunk of memory to be returned in response to a next request.

A size field 406—indicating a size of the pool.

An overflow field 408—indicating whether the offset field points to a valid allocation.

Referring now back to FIG. 2, at 206, the single atomic operation checks the data structure for a condition.

At 208, the single atomic operation updates the data structure, in response to the outcome of the check.

For clarity, different implementations are now described, by describing feature 206 followed by 208 for each implementation, i.e., since it is clearer to follow described multiple implementations of what is checked followed by what is updated in response to the outcome of the check, by focusing on one implementation at a time.

It is noted that the exemplary implementations may be combined, with one, or more, or all of the implementations being executed during the single atomic operation. It is noted that different implementations may be designed for the different exemplary memory implementations described herein.

In a first exemplary implementation: at 206, the single atomic operation checks whether the validity field bit is unset or the overflow field is set. At 208, in response to the validity field bit being unset or the overflow field being set, the single atomic operation sets the overflow field. Otherwise the single atomic operation increases the offset field by a size of the allocated memory, and the single atomic operation increases the counter field by 1.

In a second exemplary implementation: at 206, the single atomic operation checks whether the counter field increased by 1. At 208, in response to the counter field increasing by 1, the counter field overflows into the data structure, and the single atomic operation returns the offset field value prior to the increase by the size of the allocated memory. The offset field value prior to the increase is returned to the code that triggered execution of the single atomic operation. It is noted that the software is notified of what the memory was before the change, because if an overflow happens, the software needs to be able to tell if it is the software that caused the overflow or if the overflow was already like that before (i.e., something else other than the software caused it).

In a third exemplary implementation: at 206, the single atomic operation checks whether a total allocated size of a slot (of the current pool being used to allocate memory) is being increased beyond a total size of the slot. At 208, in response to the total allocated size of the slot being increased beyond the total size of the slot, the single atomic operation sets the overflow field to a first value. At 206, the single atomic operation checks whether the overflow field is set to the first value. At 208, when the overflow field is set to the first value, the single atomic operation sets the overflow field to the second value.

At 210, the single atomic operation returns an address of the allocated region of the memory. The address is returned to the software process that executed the single atomic operation.

Alternatively or additionally, the single atomic operation returns other data, for example, instead of the address (e.g., when the allocation failed) and/or in association with the address.

At 212, the software process that executed the single atomic operation may perform one or more actions in response to the data returned by the single atomic operation.

For example, with respect to the third exemplary implementation described with reference to 206 and 208, when the first value is returned, the processor executes a code for requesting another pool in response to the first value. When the second value is returned, the processor executes a code for waiting for a previous task to complete.

For example, a memory is divided into slots, each of size 100 bytes. The slots are not associated with any specific sizes (i.e., no class sizes). Consider the 1500 . . . 1600 slot. The following data is saved in the memory allocator: The allocation offset (initially 1500); The total allocated size (initially 0); and Overflow bits (initially 0). Now, if an allocation of 30 bytes was requested, the area 1500 . . . 1530 is allocated, the state of the data structure is updated by the single atomic operation as such: Allocation offset is increased to 1530; and Total allocated size is increased to 30. If the total allocated size is increased beyond the size of the slot (100), the first overflow bit is set. If another allocation is requested, the second overflow bit is set. In the event that the first overflow bit was set, the software asks for more memory. In the event that the second overflow bit is set, the software waits for the other request to complete.

When the single atomic operation returns an indication that the validity field is unset, or the overflow field has a first value, the processor executes a code for requesting a new pool from a memory manager.

When the single atomic operation returns an indication that the overflow field has a second value indicating another request for a new pool is being made from the memory manager, the processor executes a code for waiting a time interval for the another request to complete, and requests the new pool from the memory manager. In other cases the offset field is used to determine the allocated memory.

Optionally, the memory allocator may increase a counter designated for the pool in response to the request to release the memory. The location of the counter may be computed according to an address of the memory being freed. The pool may be returned to the memory manager in response to the counter value indicating that all memory in the pool is freed.

At 214, the memory allocator releases the previously allocated memory in the single atomic operation, in response to the request.

Alternatively or additionally, the memory allocator may set a bit in a bitmap implementation of the data structure, the bitmap designated for the pool in response to the request to release the memory. The set bit indicates that a memory chunk (e.g., the memory region) was released. The pool may be returned to the memory manager in response to a value of the bitmap indicating that all memory in the pool is freed. The memory allocator may use the bitmap for reusing released memory chunks (e.g., regions) in future allocations.

Alternatively or additionally, the memory allocator may write an entry in a linked-list implementation of the data structure, in response to the request to release the memory. The memory allocator may use the linked-list for reusing released memory chunks (e.g., regions) in future allocations.

Alternatively or additionally, during the feature described with reference to 204 (i.e., reading the data structure), the single atomic operation reads the data structure implemented as the bitmap and/or the linked-list indicating the state of allocation of the pool, and uses a previously released memory chunk for the allocation.

At 216, one or more features described with reference to 202-214 are iterated. The single atomic operation operates sequentially in response to each request. Concurrent requests are sequentially processed. This avoids allocation and deallocation of memory at the same time.

Figure 5:
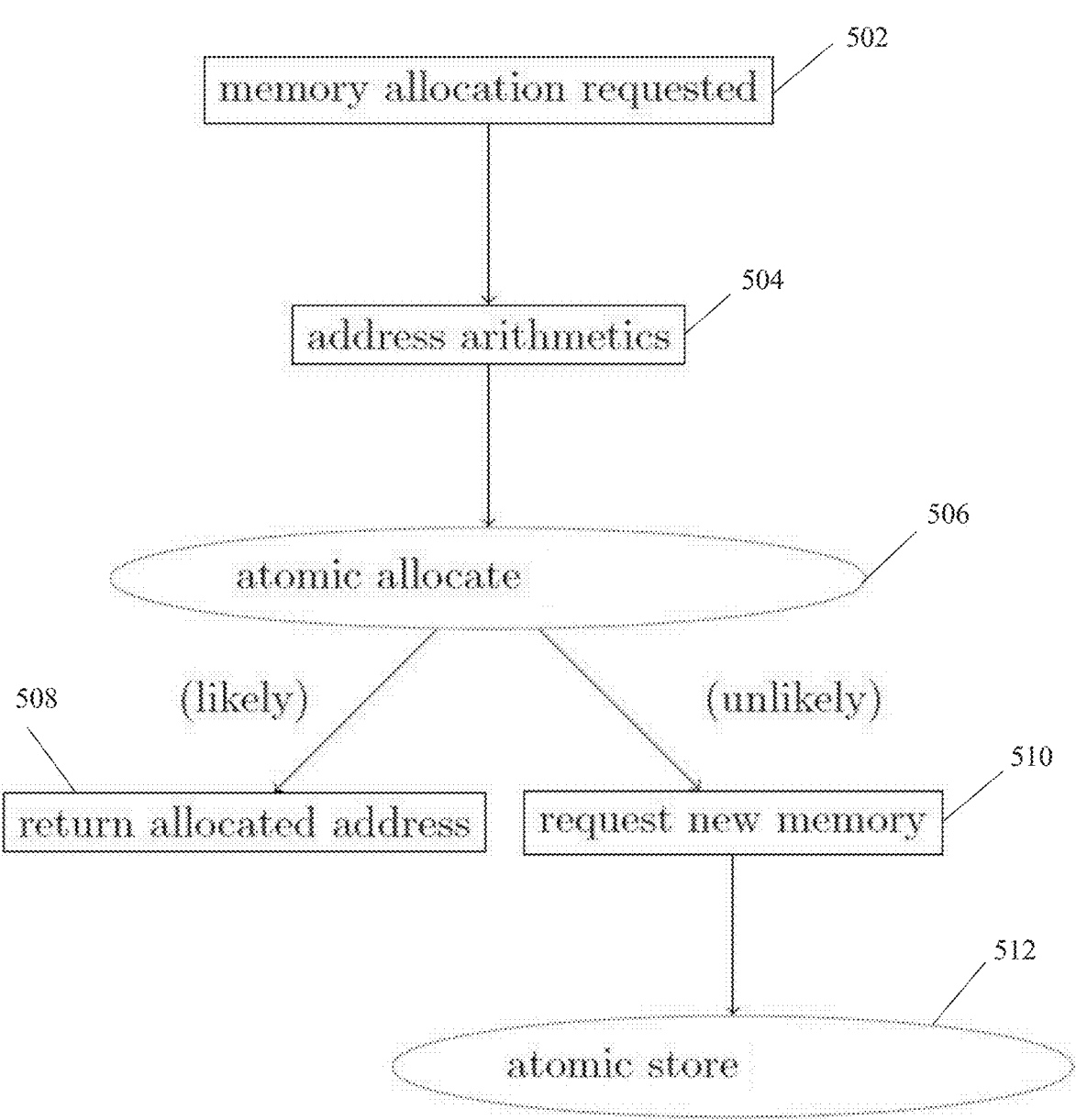
FIG. 5 is a flowchart of an exemplary implementation of the memory allocator that performs the single atomic operation, in accordance with some embodiments of the present invention.

Reference is now made to FIG. 5, which is a flowchart of an exemplary implementation of the memory allocator that performs the single atomic operation, in accordance with some embodiments of the present invention. The features described with reference to FIG. 5 may be implemented by components of system 100 described with reference to FIG. 1. The features described with reference to FIG. 5 may be based on, and/or include, and/or be integrated with, the features of the method described with reference to FIG. 2.

At 502, memory allocation is requested by a process being executed by a processor in communication with the memory allocator.

At 504, address arithmetic may be computed, for example, to select the pool from which memory is to be allocated, for example, based on available memory and/or the size of the requested memory (e.g., the size class of the pool is selected to fit the size class of the requested memory).

At 506, the single atomic operation is performed in an attempt to allocate the requested memory.

At 508, when the single atomic operation is successful, the address of the allocated memory is returned, and provided to the requesting process.

Alternatively, at 510, when the single atomic operation fails, an indication is returned. A new memory pool (e.g., slot) is requested.

At 512, the single atomic operation is repeated using the new memory pool.

Figure 6:
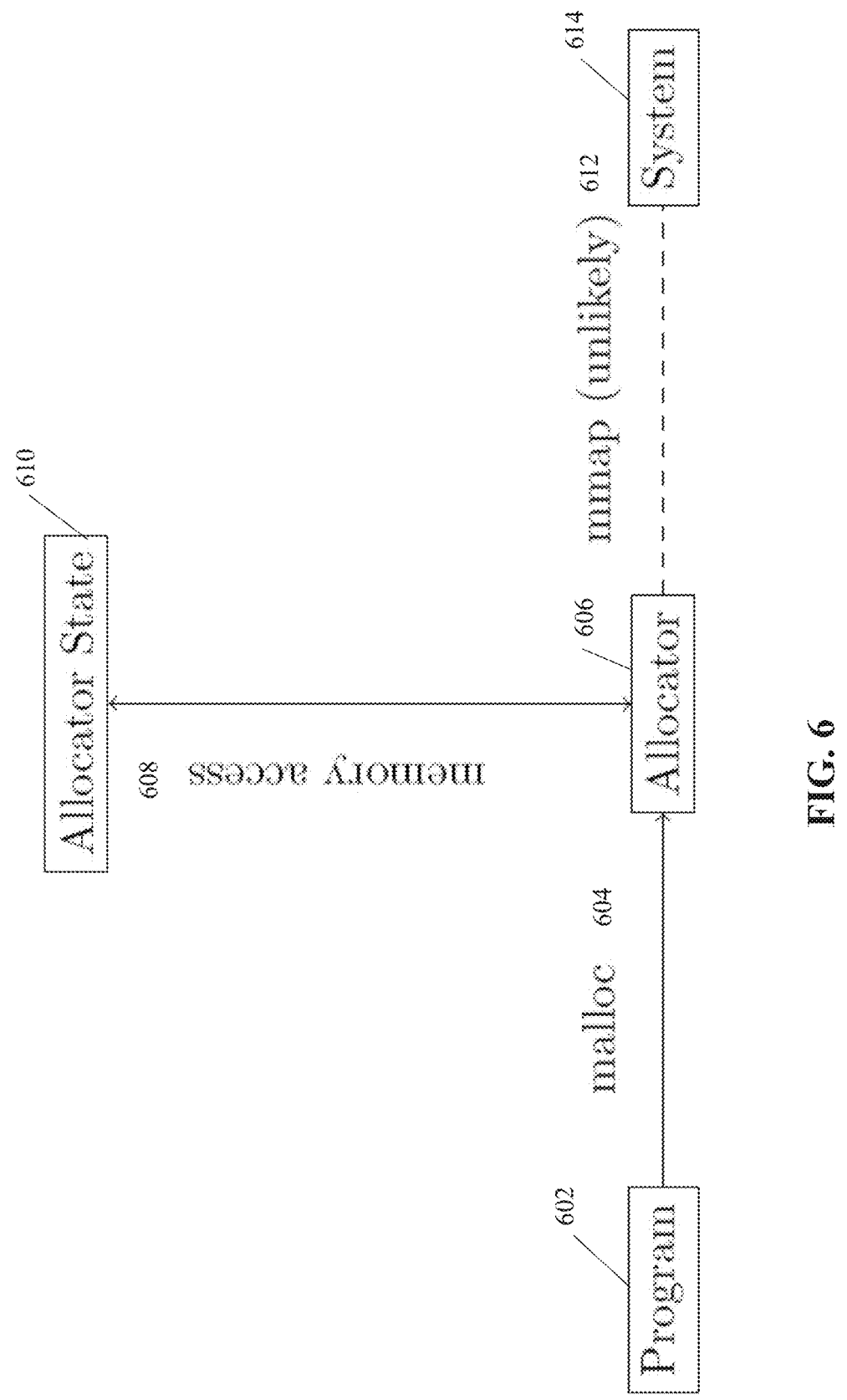
FIG. 6 is a flowchart of another exemplary implementation of the memory allocator that performs the single atomic operation, in accordance with some embodiments of the present invention.

Reference is now made to FIG. 6, which is a flowchart of another exemplary implementation of the memory allocator that performs the single atomic operation, in accordance with some embodiments of the present invention. The features described with reference to FIG. 6 may be implemented by components of system 100 described with reference to FIG. 1. The features described with reference to FIG. 6 may be based on, and/or include, and/or be integrated with, the features of the method described with reference to FIG. 6.

A program 602 provides a request 604 for allocation of memory (e.g., using a malloc function, or other implementation) to memory allocator 606. Allocator 606 performs a memory access 608 using a single atomic operation, as described herein. A data structure representing an allocator state 610 is updated, as described herein. When allocator 606 fails to perform the allocation of memory using the single atomic operation, allocator 606 requests additional memory 612 (e.g., using the mmap function or other implementation) from a system 614.

Reference is now made to FIG. 7, which is an exemplary pseudocode 702 for using the single atomic operation for allocation of memory, in accordance with some embodiments of the present invention. Pseudocode 702 is designed to be used in association with the first exemplary memory architecture, based on division according to class size (e.g., as described herein).

Reference is now made to FIG. 8, which is another exemplary pseudocode 802 for using the single atomic operation for allocation of memory, in accordance with some embodiments of the present invention. Pseudocode 802 is designed to be used in association with the second exemplary memory architecture, based on division into arbitrary sizes (e.g., as described herein).

The methods as described above may be used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant memory allocators will be developed and the scope of the term memory allocator is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A device for accelerating allocation of a region of a pool of a memory for computing devices processing, configured for:

in response to a request for allocation of the region of the pool of the memory by a process being executed by a processor, a memory allocator is configured to perform, in real-time, an accelerated allocation of said region of said pool of said memory by executing a single non-interruptible atomic operation without communicating with a memory manager, said single non-interruptible atomic operation comprising:

accessing a data structure indicating a state of allocation of the pool;

checking the data structure for a condition;

updating the data structure according to an outcome of the checking; and returning an address of the data structure as the allocated region of the pool of the memory.

2. The device of claim 1, wherein the processor is designed according to a data-flow processing architecture.

3. The device of claim 1, wherein the processor is designed for a customized architecture designed to perform at least one of: signal processing, network routing, graphics, and telemetry.

4. The device of claim 1, wherein the memory allocator is further configured to release previously allocated memory in the single non-interruptible atomic operation, in response to a request to release the memory.

5. The device of claim 4, wherein the memory allocator is further configured to increase a counter designated for the pool in response to the request to release the memory, wherein a location of the counter is computed according to an address of the memory being freed, and the pool is returned to the memory manager in response to a value of the counter indicating that all memory in the pool is freed.

6. The device of claim 4, wherein the data structure comprises a bitmap, wherein the memory allocator is further configured to set a bit in the bitmap designated for the pool in response to the request to release the memory, the set bit indicating that the allocated region of the memory was released, wherein the pool is returned to the memory manager in response to a value of the bitmap indicating that all memory in the pool is freed, wherein memory allocator uses the bitmap for reusing released memory regions in future allocations.

7. The device of claim 4, wherein the data structure comprises a linked-list, wherein the memory allocator is further configured to write an entry in the linked-list in response to the request to release the memory, wherein the memory allocator uses the linked-list for reusing released memory chunks in future allocations.

8. The device of claim 4, wherein during the access of the data structure indicating the state of allocation of the pool, the single non-interruptible atomic operation further comprises reading the data structure implemented as one of a bitmap and a linked-list, and uses a previously released memory chunk for the accelerated allocation.

9. The device of claim 1, wherein the single non-interruptible atomic operation includes a sequence of the accessing, the checking, the updating, and the returning operations that cannot be interrupted once initiated.

10. The device of claim 1, wherein the single non-interruptible atomic operation operates sequentially in response to a request, wherein concurrent requests are sequentially processed.

11. The device of claim 1, wherein the single non-interruptible atomic operation excludes a request to the memory manager to obtain the pool of the memory, and/or excludes a request to the memory manager to return the pool to the memory, wherein the pool is allocated by the memory allocator.

12. The device of claim 1, wherein the memory is divided into a single area for each one of a plurality of size classes, each single area is further divided into a plurality of slots, a slot comprises the pool for allocation by the memory allocator for allocation sizes that match a size class corresponding to the pool, wherein the access of the data structure comprises checking a number of allocations previously performed for the slot indicating an amount of space remaining in the slot for allocation.

13. The device of claim 12, wherein the data structure includes a plurality of fields, wherein:

an offset field indicates an address of a next chunk of memory to be returned in response to a next request, a counter field indicating the number of allocations previously performed for the slot;

a validity field used for a first allocation of the single area indicating that the memory allocator has not yet been initialized for the single area; and an overflow field indicates whether the offset field points to a valid allocation.

14. The device of claim 13, wherein the check of the data structure for the condition comprises:

in response to a validity field bit being unset or the overflow field being set, the overflow field is set, wherein when said validity field bit is set and the overflow field is unset, the offset field is increased by a size of the allocated region, and a counter field is increased by 1.

15. The device of claim 14, wherein the check of the data structure for the condition comprises:

in response to the counter field increasing by 1, the counter field overflows into the data structure, and the offset field value prior to the increase by the size of the allocated region is returned.

16. The device of claim 15, wherein the processor further executes a code for:

in response to the validity field being unset, or the overflow field having a first value, requesting a new pool from the memory manager;

in response to the overflow field having a second value indicating another request for a new pool is being made from the memory manager, waiting a time interval for the another request to complete, and requesting the new pool from the memory manager; and wherein when the validity field being set and the overflow field does not have said first or second value, use the offset field to determine the allocated region.

17. The device of claim 1, wherein the pool is divided into regions of arbitrary sizes.

18. The device of claim 17, wherein the data structure includes a plurality of fields, wherein:

an offset field indicates an address of a next chunk of memory to be returned in response to a next request, a size field indicating a size of the pool, and an overflow field indicates whether the offset field points to a valid allocation.

19. The device of claim 18, wherein the update to the data structure comprises:

in response to a total allocated size of a slot comprising the pool being increased beyond a total size of the slot, setting the overflow field to a first value;

in response to receiving another allocation request when the overflow field is set to the first value, setting the overflow field to a second value;

wherein the processor executes a code for requesting another pool in response to the first value, and waiting for a previous task to complete in response to the second value.

20. A method for accelerating allocation of a region of a pool of a memory for computing devices processing, comprising:

performing in real-time, an accelerated allocation of the region of the pool of the memory by executing, in response to a request for allocation of said region of said pool of said memory, wherein said accelerated allocation is conducted in a single non-interruptible atomic operation without communicating with a memory manager, said single non-interruptible atomic operation comprising:

accessing a data structure indicating a state of allocation of the pool;

checking the data structure for a condition;

updating the data structure according to an outcome of the checking; and returning an address of the data structure as the allocated region of the pool of the memory.

21. A non-transitory medium storing program instructions for execution by at least one processor conducting accelerated allocation of a region of a pool of a memory; for use by computing devices processing, said program instructions, when executed by the at least one processor, cause the at least one processor to:

perform in real-time, an accelerated allocation of the region of the pool of the memory by executing, in response to a request for allocation of said region of said pool of said memory, wherein said accelerated allocation is conducted in a single non-interruptible atomic operation without communicating with a memory manager, said single non-interruptible atomic operation comprising:

accessing a data structure indicating a state of allocation of the pool;

checking the data structure for a condition;

updating the data structure according to an outcome of the checking; and returning an address of the data structure as the allocated region of the pool of the memory.

* * * * *